(12) United States Patent
Bobbarjung et al.

(10) Patent No.: US 11,394,667 B2
(45) Date of Patent: Jul. 19, 2022

(54) CHATBOT SKILLS SYSTEMS AND METHODS

(71) Applicant: Rupert Labs Inc., Mountain View, CA (US)

(72) Inventors: Deepak Bobbarjung, Sunnyvale, CA (US); Madhusudan Mathihalli, Saratoga, CA (US); Mitul Tiwari, Mountain View, CA (US); Kurt MacDonald, San Jose, CA (US); Ravi Narasimhan Raj, Los Altos, CA (US)

(73) Assignee: Rupert Labs, Inc., Santa Clara, CA (US)

( * ) Notice: Subject to any disclaimer, the term of this patent is extended or adjusted under 35 U.S.C. 154(b) by 0 days.

(21) Appl. No.: 16/220,856

(22) Filed: Dec. 14, 2018

(65) Prior Publication Data

US 2019/0124020 A1 Apr. 25, 2019

Related U.S. Application Data

(63) Continuation-in-part of application No. 16/151,156, filed on Oct. 3, 2018.

(60) Provisional application No. 62/567,674, filed on Oct. 3, 2017.

(51) Int. Cl.
*H04L 12/58* (2006.01)
*H04L 51/02* (2022.01)
*G06F 16/958* (2019.01)
*H04L 51/046* (2022.01)
*G06Q 20/12* (2012.01)
*G06N 5/00* (2006.01)
*H04L 51/04* (2022.01)

(52) U.S. Cl.
CPC ............ *H04L 51/02* (2013.01); *G06F 16/958* (2019.01); *G06N 5/00* (2013.01); *G06Q 20/123* (2013.01); *H04L 51/046* (2013.01); *H04L 51/04* (2013.01)

(58) Field of Classification Search
None
See application file for complete search history.

(56) References Cited

U.S. PATENT DOCUMENTS

| 2016/0349935 | A1* | 12/2016 | Gelfenbeyn | ....... G06Q 30/0601 |
| 2017/0213155 | A1* | 7/2017 | Hammond | ............. G06Q 10/00 |
| 2017/0310613 | A1* | 10/2017 | Lalji | ....................... G06F 40/30 |
| 2017/0357638 | A1* | 12/2017 | Schlesinger | ........ G06F 16/3344 |
| 2018/0102989 | A1* | 4/2018 | Borsutsky | ............... H04L 51/02 |
| 2019/0034409 | A1* | 1/2019 | Curtis | ................... G06F 40/123 |
| 2020/0150839 | A1* | 5/2020 | Roisman | ................. H04L 51/02 |

* cited by examiner

*Primary Examiner* — Natisha D Cox
(74) *Attorney, Agent, or Firm* — Fletcher Yoder PC

(57) ABSTRACT

Example systems and methods related to chatbot skills are described. In one implementation, a system initiates a session to create a new chatbot. The system receives a selection of a first chatbot skill associated with the new chatbot and a selection of a second chatbot skill associated with the new chatbot, where the first chatbot skill is different from the second chatbot skill. The system creates the new chatbot by importing the first chatbot skill and the second chatbot skill into the new chatbot.

20 Claims, 14 Drawing Sheets

CHATBOT SKILLS SYSTEMS AND METHODS

RELATED APPLICATION

This application is a Continuation In Part of U.S. application Ser. No. 16/151,156, entitled "Natural Language Processing Systems and Methods," filed Oct. 3, 2018. That application claims the priority benefit of U.S. Provisional Application Ser. No. 62/567,674, entitled "Natural Language Processing Systems and Methods," filed Oct. 3, 2017, the disclosure of which is incorporated by reference herein in its entirety.

TECHNICAL FIELD

The present disclosure relates to systems and methods that are capable of creating and implementing conversational interfaces, chatbots, voice assistants, and the like.

BACKGROUND

The use of bots in computing systems, and particularly online computing systems, is growing rapidly. A bot (also referred to as an "Internet bot", a "web robot", and other terms) is a software application that executes various operations (such as automated tasks) via the Internet or other data communication network. For example, a bot may perform operations automatically that would otherwise require significant human involvement. Example bots include chatbots that communicate with users via a messaging service, and voice assistants that communicate with users via voice data or other audio data. In some situations, chatbots simulate written or spoken human communications to replace a conversation with a real human person.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 6 illustrates an example bot creation user interface that allows a user to select a bot name, type of bot to build, optional default intents, and the like.

DETAILED DESCRIPTION

Figure 1:
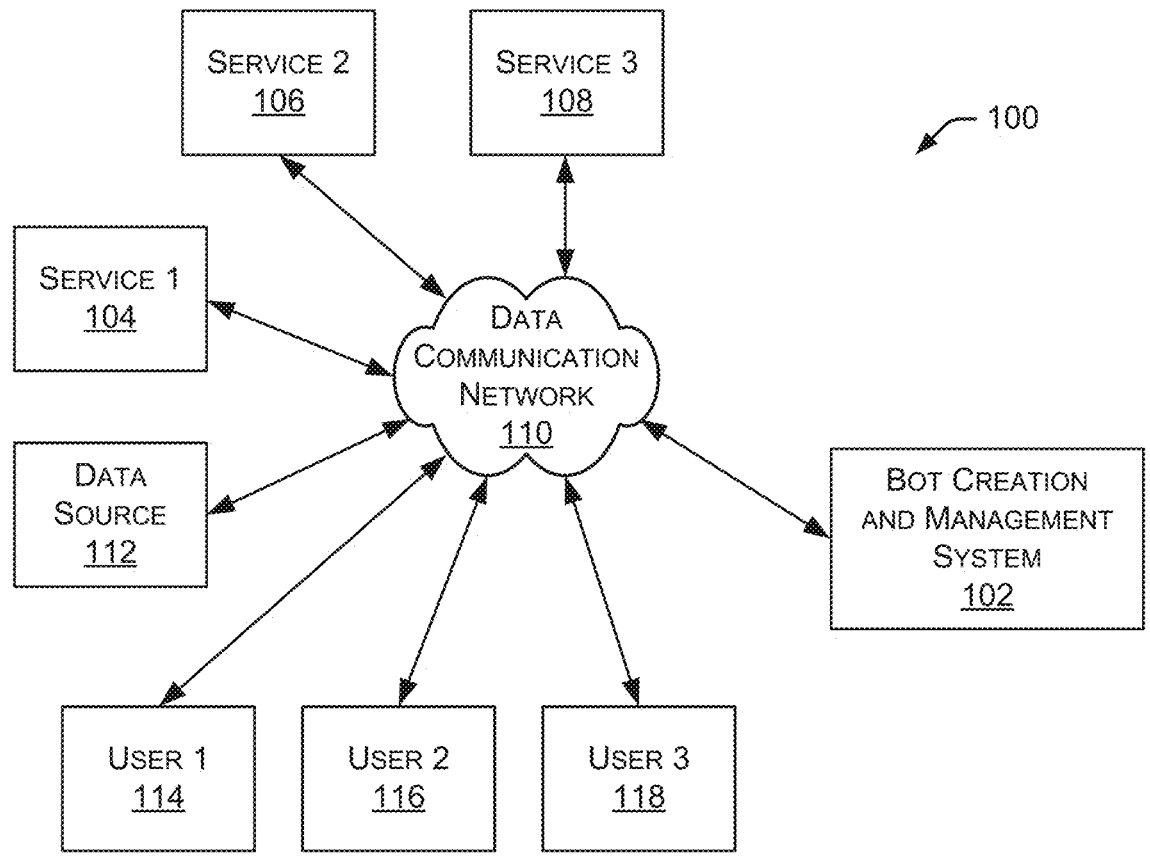
FIG. 1 is a block diagram illustrating an environment within which an example embodiment may be implemented.

In the following disclosure, reference is made to various figures and drawings which are shown as example implementations in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. In the following description, the terms "bot" and "chatbot" may be used interchangeably.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

The systems and methods described herein relate to bot builder platforms and natural language processing systems and methods for building conversational interfaces, chatbots, voice assistants, and the like. In particular embodiments, systems and methods are described for building a bot in a visual manner with natural language understanding (NLU) and natural language processing (NLP) ability for understanding natural language in the form of text or voice. For example, particular applications may include an intelligent conversational interface, chatbot, or voice assistant.

FIG. 1 is a block diagram depicting an environment 100 within which an example embodiment may be implemented. A bot creation and management system 102 is coupled to (or capable of accessing) multiple services 104, 106, and 108 via a data communication network 110. In some embodiments, services 104, 106, and 108 are implemented using any type of system, such as one or more servers and/or other computing devices. Services 104, 106, and 108 include any type of service offered to any type of client or customer, such as cellular communication services, wireless communication services, video services, audio services, chat services, messaging services, email services, audio conferencing services, video conferencing services, phone services, vehicle services, wearable device services, computing services, television services, entertainment services, and the like. In some embodiments, users may communicate with other users or businesses via any of services 104, 106, and 108. For example, users may communicate with other users or businesses using messaging platforms, voice platforms, or any other type of platform using an interface, such as a conversational interface.

Although three services 104, 106, and 108 are shown in FIG. 1, alternate embodiments may include any number of services coupled to (or accessible by) bot creation and management system 102.

As shown in FIG. 1, bot creation and management system 102 is also coupled to (or capable of accessing) a data source 112 and multiple users 114, 116, and 118. Data source 112 represents any type of system or service capable of storing and providing any type of data to one or more other devices or systems. For example, data source 112 may include a knowledge base or any other collection of data that may be useful to the systems and methods discussed herein. The multiple users 114, 116, and 118 include any individuals or groups that interact with services 104-108, data source 112, and bot creation and management system 102. In some embodiments, one or more of the users 114-118 are communicating with one or more of the services 104-108 or bot creation and management system 102 using an intelligent conversational interface, chatbot, or voice assistant.

Although one data source 112 and three users 114, 116, and 118 are shown in FIG. 1, alternate embodiments may include any number of data sources and any number of users coupled to (or accessible by) bot creation and management system 102.

As shown in FIG. 1, bot creation and management system 102 communicates with various systems and services via data communication network 110. Data communication network 110 includes any type of network topology using any communication protocol. Additionally, data communication network 110 may include a combination of two or more communication networks. In some embodiments, data communication network 110 includes a cellular communication network, the Internet, a local area network, a wide area network, or any other communication network.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
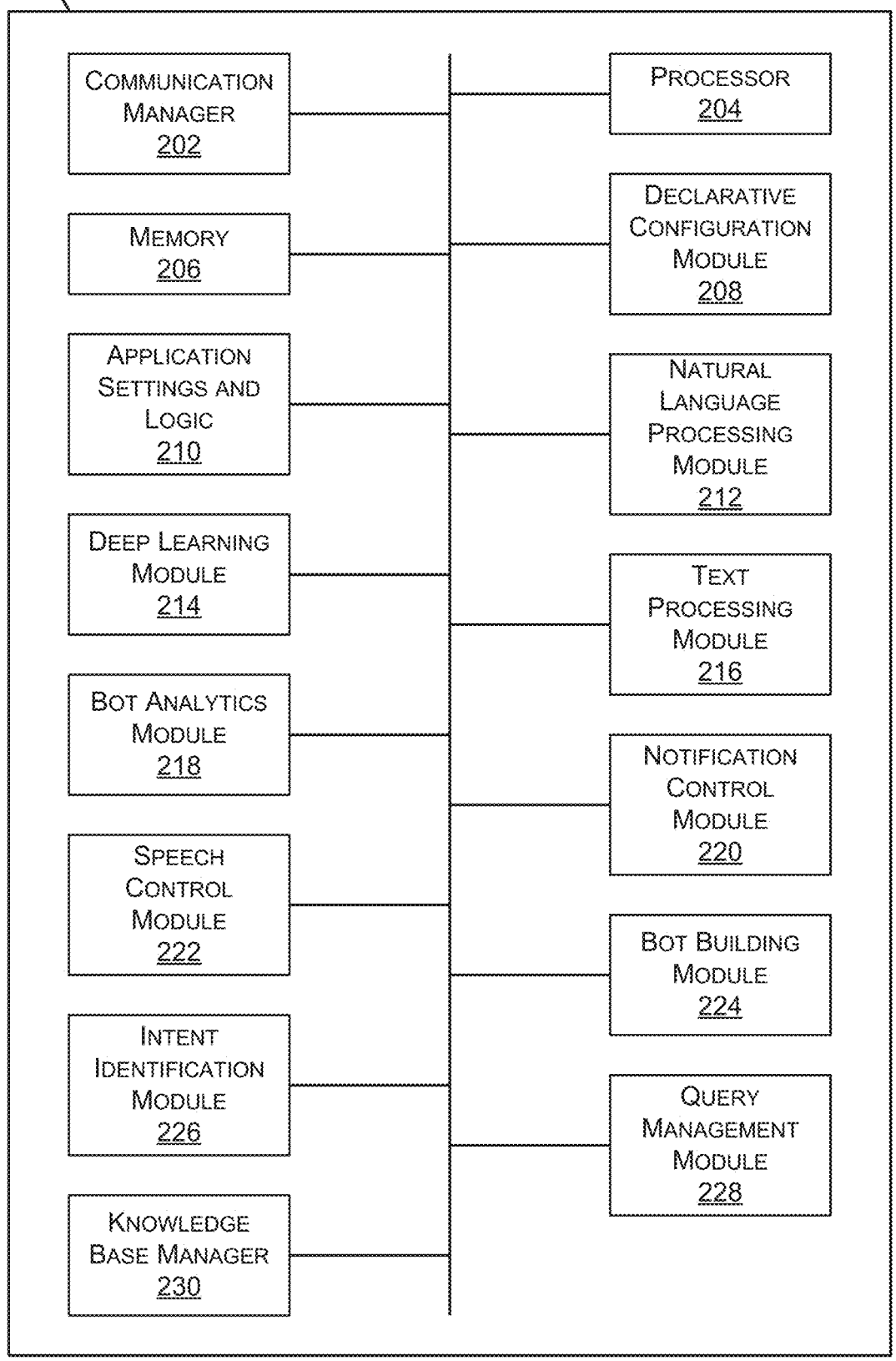
FIG. 2 is a block diagram depicting an embodiment of a bot creation and management system.

FIG. 2 is a block diagram depicting an embodiment of bot creation and management system 102. As shown in FIG. 2, bot creation and management system 102 includes a communication manager 202, a processor 204, and a memory 206. Communication manager 202 allows bot creation and management system 102 to communicate with other systems, such as services 104-108, data source 112, users 114-118, and the like. Processor 204 executes various instructions to implement the functionality provided by bot creation and management system 102, as discussed herein. Memory 206 stores these instructions as well as other data used by processor 204 and other modules and components contained in bot creation and management system 102.

Bot creation and management system 102 also includes a declarative configuration module 208 that allows a customer, user, or other person or system to set configuration information associated with one or more bots, as discussed herein. Application settings and logic 210 provide various settings, rules, and other logic functions to implement the systems and methods discussed herein. A natural language processing module 212 performs various natural language processing tasks as discussed herein. A deep learning module 214 performs various deep learning functions to implement the systems and methods discussed herein. A text processing module 216 performs various text processing tasks, such as processing text in a received message and processing text in a response to a received message. A bot analytics module 218 performs various analysis operations as discussed herein.

Bot creation and management system 102 further includes a notification control module 220 that controls various messages and notifications within the systems and methods described herein. A speech control module 222 manages various speech data, such as speech data associated with received voice messages and speech data associated with responses generated by the systems and methods discussed herein. A bot building module 224 enables a user or system to create a bot to perform one or more specified tasks. In some embodiments, bot building module 224 may build (or create) a chatbot using one or more chatbot skills, as discussed herein. For example, bot building module 224 may import one or more chatbot skills from a chatbot skills marketplace (or other data source) to create a new chatbot.

An intent identification module 226 determines an intent associated with, for example, a received message. A query management module 228 performs various functions associated with analyzing, processing, and generating queries as discussed herein. A knowledge base manager 230 performs various functions associated with managing data in a knowledge base, such as accessing data from the knowledge base, storing data into the knowledge base, and updating information stored in the knowledge base.

Bot creation and management system 102 shown in FIG. 2 represents one embodiment. In alternate embodiments, any one or more of the components shown in FIG. 2 may be implemented in a different system, device or component. For example, the components associated with creating and training a bot may be provided in one system (such as a bot training system or bot creation system), and the components associated with managing and/or implementing particular bots may be provided in one or more other systems (such as a bot management system or a bot implementation system).

The systems and methods discussed herein provide a conversational interface that includes an ability to interact with a computing system in natural language and in a conversational way. The described systems and methods also include a bot building platform as described herein. The systems and methods described herein enable a computing system to understand natural language so it can interpret what the user means in terms of intent and extract information to generate a response back to the user. Intent identification is a part of natural language understanding to determine an intent from the natural language of a user. Entity and attribute extraction includes extracting various useful information from the natural language. In some embodiments, customized notifications allow a computing system to send notifications to a user on a particular messaging platform with custom intent responses.

The systems and methods described herein perform various bot analytics operations, such as bot usage and bot metrics that measure, for example, a number of messages per intent or the most frequently identified intents. Responses from a bot can be personalized by changing the response based on the particular user who will receive the response. The described systems and methods are also capable of extracting the right information from a natural language message to send, for example, as a query to APIs (Application Programming Interfaces). An interactive knowledge base consists, for example, of long articles and frequently asked questions. An interactive knowledge base search provides the ability to narrow down the right information through back and forth interaction by asking simple questions and navigating through the vast amount of knowledge base data.

The described systems and methods also include a sentiment analysis and complaint classifier that has the ability to understand user sentiments from their messages and understand whether a user's message is a complaint and needs to be directed to a customer service representative. The sentiment analysis and complaint classifier also has the ability to detect changes in sentiments across a sequence of messages.

In some embodiments, the systems and methods described herein keep track of useful and contextual information across messages. For example, a user may search for a product in a message and in the next message ask for the price, but without specifying the product. The bot builder platform described herein provides a mechanism to keep track of useful information and context across multiple messages. Additionally, the described systems and methods support sequence learning and auto-replies. For example, the systems and methods have the ability to learn from a sequence of interactions and automatically reply to certain messages based on past interactions. For instance, if a question has been answered in the past by a customer service representative, the same answer may be used to respond to future questions.

Figure 3:
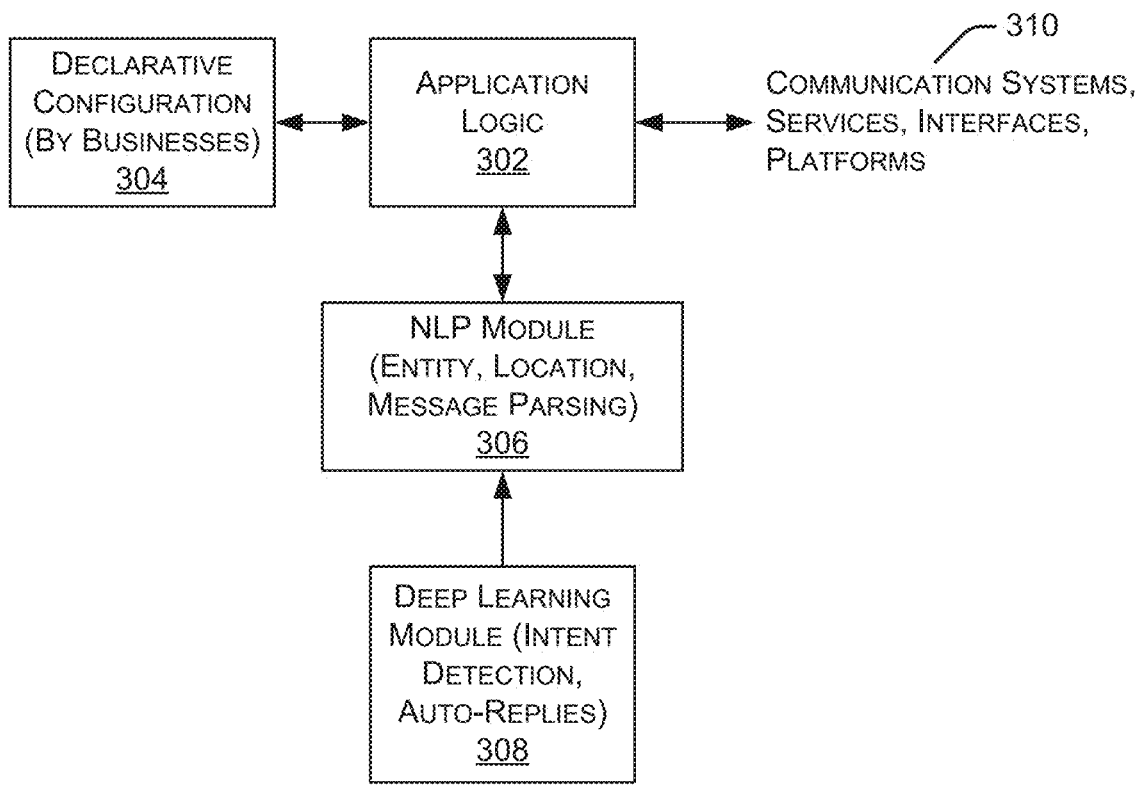
FIG. 3 is a block diagram depicting an embodiment of a system for responding to messages or requests received from a remote system.

FIG. 3 is a block diagram depicting an embodiment of a system for responding to messages or requests received from a remote system. In some embodiments, FIG. 3 represents a particular bot (e.g., a chatbot) configured to respond to messages or other requests. Application logic 302 receives any number of messages or requests from a remote system 310, such as a communication system, communication service, communication interface, messaging system, messaging service, communication platform, messaging platform, messaging channels, and the like. In particular embodiments, the requests are received from Facebook Messenger, Slack, Skype, and other messaging channels. The request may include a text message, a voice (e.g., audio) message, and the like. Application logic 302 performs various tasks based on the type of request received, the content of the received request, and other factors. For example, application logic 302 may consider a declarative configuration 304 which is defined by a business, a customer, or other person or entity associated with operation of a particular bot. For example, declarative configuration 304 may define how to respond to a particular request or message based on the identified intent in the request or message.

Application logic 302 is also coupled to NLP (Natural Language Processing) module 306, which performs various tasks, such as entity determination, location identification, message parsing, and the like. NLP module 306 may also provide intent information (e.g., an intent that can be determined or inferred from the content of the received request or message) to application logic 302 for use in responding or otherwise processing the received request. In some embodiments, the intent information is maintained in a deep learning module 308 that provides information regarding intent and other information to assist in responding to the request. The information provided by deep learning module 308 is based on machine learning and analysis of multiple requests and ground truth information associated with those multiple requests.

After application logic 302 receives the intent information from NLP module 306, application logic 302 uses the intent information along with the information in declarative configuration 304 to generate a response to the request. For example, the response may be a simple text response (e.g., "hello"), an API call to another data source to retrieve data necessary for the response, and the like.

Figure 4:
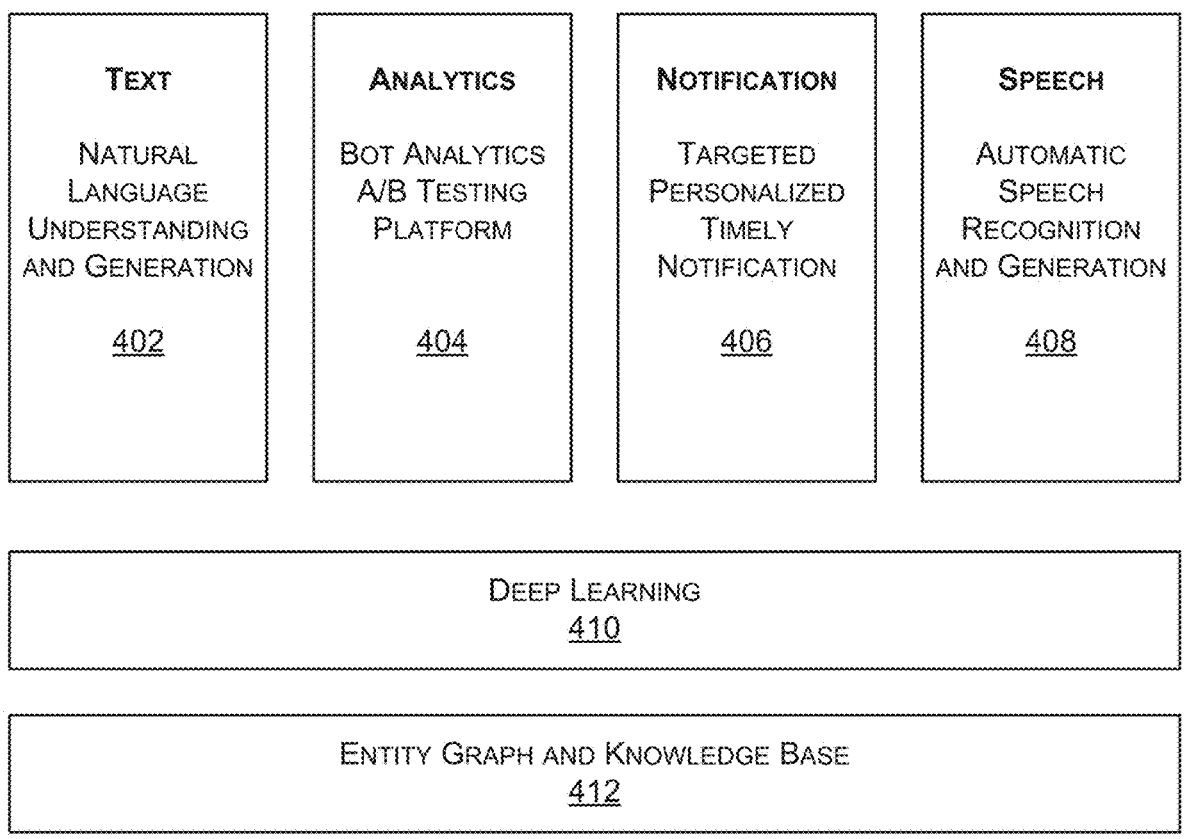
FIG. 4 is a block diagram depicting an embodiment of a framework that supports conversational artificial intelligence, as described herein.

FIG. 4 is a block diagram depicting an embodiment of a framework that supports conversational artificial intelligence, as described herein. In the framework of FIG. 4, a text portion 402 of the framework provides natural language understanding and generation, and an analytics portion 404 of the framework provides various bot analytics, AB testing functions, and other tasks to generate analytical information. A notification portion 406 of the framework provides different types of notifications in a targeted, personalized, and timely manner. A speech portion 408 of the framework performs various tasks associated with automatic speech recognition and generation. A deep learning portion 410 of the framework performs various deep learning and machine learning functions to implement the systems and methods discussed herein. An entity graph and knowledge base portion 412 of the framework performs functions associated with various entity graphs and knowledge bases, as discussed herein.

Figure 5:
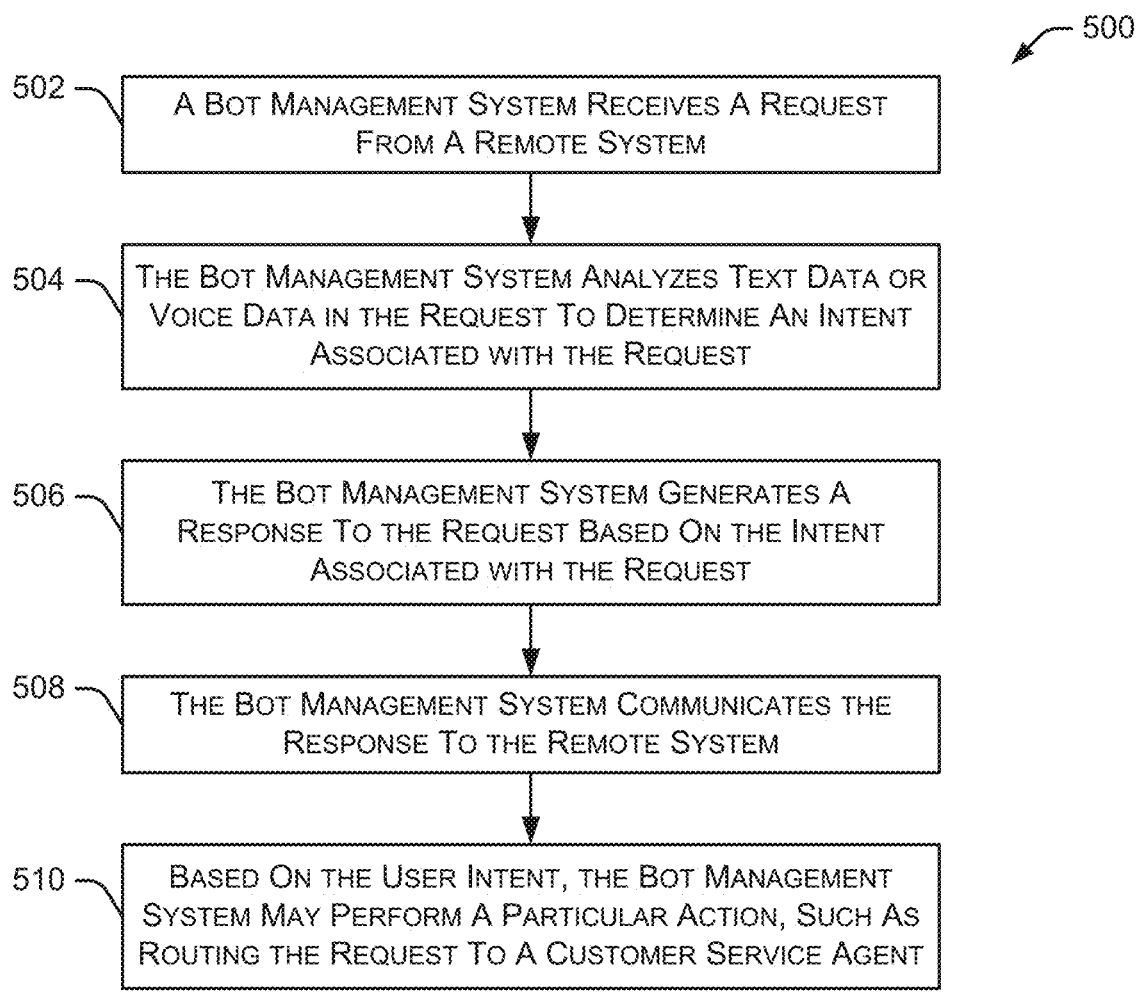
FIG. 5 is a flow diagram depicting an embodiment of a method for responding to messages or requests received from a remote system.

FIG. 5 is a flow diagram depicting an embodiment of a method 500 for responding to messages or requests received from a remote system. Initially, a bot management system receives 502 a request from a remote system. The bot management system analyzes 504 the text data or voice data in the request to determine an intent associated with the request. Based on the intent associated with the request, the bot management system generates 506 a response to the request. In some embodiments, the response generated 506 may also include declarative configuration information, or any other data, as discussed herein. The bot management system then communicates 508 the response to the remote system. In some embodiments, based on the user intent, the bot management system may perform 510 a particular action or activity, such as routing the request to a customer service agent. This particular action or activity may be performed instead of generating a response or in addition to generating a response.

Figure 6:
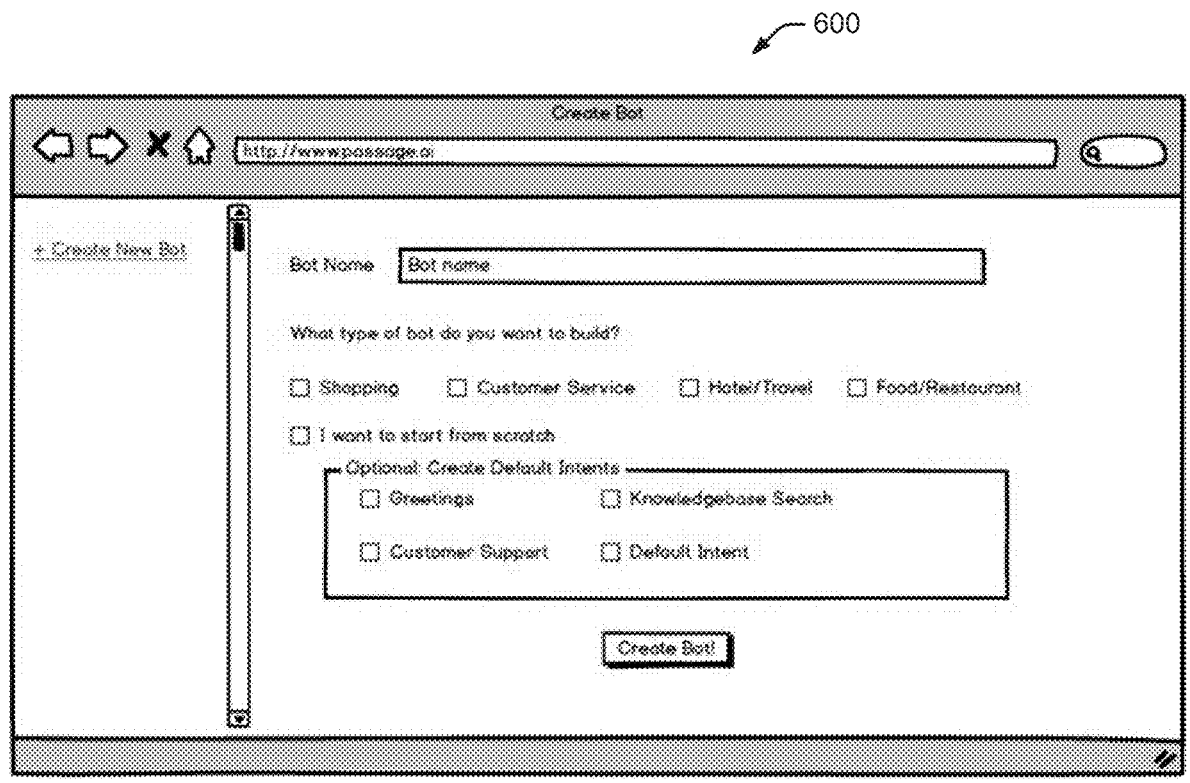

The systems and methods described herein include a bot building platform that represents a management platform and GUI (Graphical User Interface) for creating, updating, deploying, and monitoring chatbots and other bots. In some embodiments, the user can perform the following actions:
 1. Create a Chatbot or Skill
 2. Manage Intents, Webhooks, and Knowledge Bases
 3. Manage Entity, Attribute, and other data files
 4. Configure one or more Messaging platforms In some embodiments, creating a chatbot or skill is as simple as giving it a name and selecting a few options. For example, FIG. 6 illustrates an example bot creation user interface 600 that allows a user to select a bot name, type of bot to build, optional default intents, and the like. In some embodiments, the bot-creation page allows the user to choose to import one or more predefined skills or build the chatbot from scratch. If the user selects a skill, the relevant data (intents, webhooks, entities/attributes, and the like) is copied over to the chatbot and the user can choose to tune/modify the interaction component if they desire. If the "build from scratch" option is selected, the user is prompted to create one or more default intents to help with bootstrapping the bot.

This one-screen, GUI-driven approach removes the programming requirement for building a sophisticated chatbot and enables a fully functional chatbot to be built with only a few clicks. At that point, the chatbot can be integrated with any website or messaging platform, including multi-touch and voice-messaging systems. Thus, the chatbot can be created by a user without requiring any knowledge of computer coding, programming languages, scripting languages, and the like.

In some embodiments, intents are the basic building blocks of a chatbot. Each chatbot has one or more intents. Each intent has the following components:
 Intent Phrases: This is an optional set of utterances/phrases that enables the intent identification engine to determine the best intent.
 Actions: A set of actions to be performed after the intent is triggered.

Figure 7:
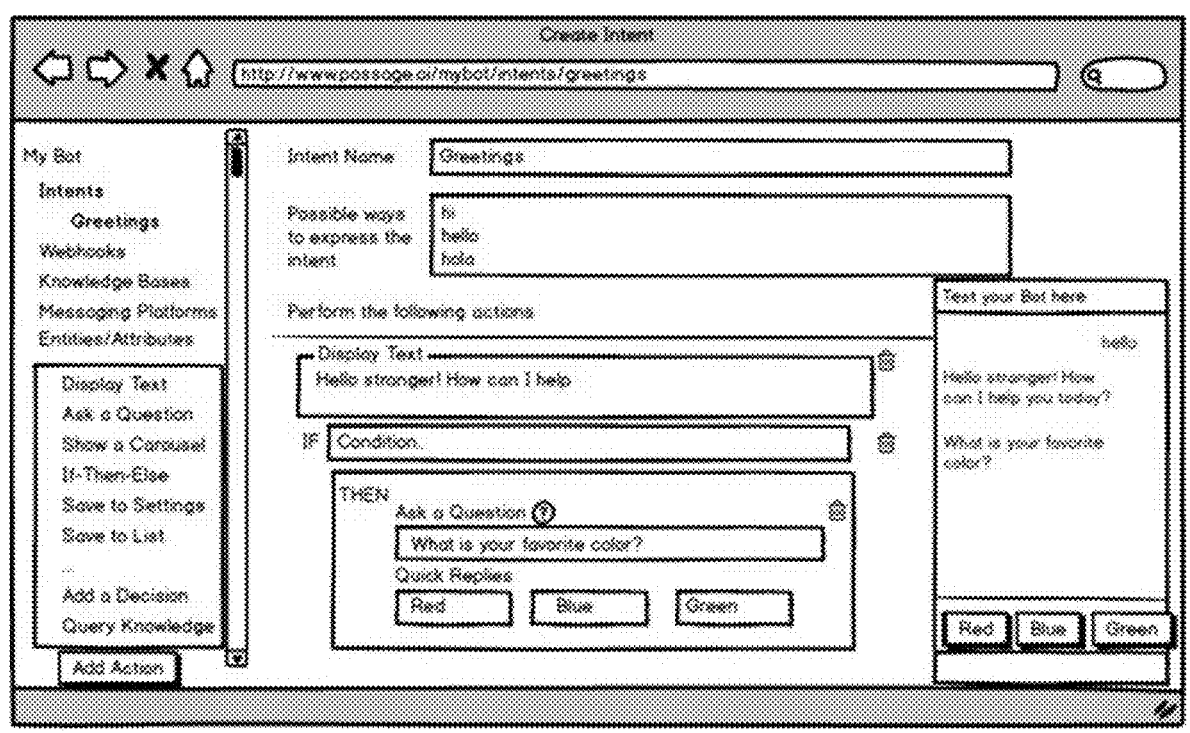
FIG. 7 illustrates an example user interface for creating intents.

An intent can be either an "entry" intent or a "follow-on/conversation" intent. The intent phrases are needed only for the entry intents. The follow-on/conversation intents are invoked based on the context of the conversation. FIG. 7 illustrates an example user interface 700 for creating intents.

The systems and methods described herein enable a rich set of interactions that are configured using a GUI and do not require the creator to write any code. Some of the supported actions supported include:
 Render one or more pieces of information (text, image, video, audio, receipt, etc.) with optional follow-on action buttons or quick-replies
 Render data as carousel with optional follow-on actions
 Render multi-level Decision Trees: Some of the decision trees supported include:
  Data-driven decision trees that are automatically created based on structured data that's uploaded to the platform
  Configuration-driven decision trees that allows users to create customized decision nodes
  Knowledge base decision trees for setup and troubleshooting guides
  Conditional branch logic based on input data or data from a datastore (including both contextual and non-contextual data)
 Support for storing/retrieving/deleting data from User profile or a built-in List
 Querying one or more knowledge bases
 Fetching data from remote sources using a webhook
 Sending an email, a text message, or a mobile device notification Using the embedded chat client in the intent editor, the user can immediately test the changes in the same window without the need to redeploy the chatbot. In some embodiments, all of the intent configuration changes are available in real-time.

At runtime, each action is evaluated independently and the response is sent to the user. Depending on the platform, the runtime translates the actions to the format that's relevant to the platform. This allows the user to focus on the business logic rather than worrying about the intricacies of the different messaging systems. There is a configurable delay between sending successive replies to avoid flooding the end-user with too many replies within a short period of time.

The above discussion describes "data-driven decision trees." The platform described herein offers this solution that allows configuration and updates to decision trees to happen dynamically as the data changes. This significantly increases the value over a manually configured decision tree that is explicitly described through a flow diagram. Since businesses are always managing lots of data, it is critical that they can create large decision trees from their data and keep it up-to-date.

Data can be provided as a file or API, in tabular format (Example: CSV) or hierarchical format (Example: JSON). Once this data is provided to the chatbot, the creator can configure an intent to trigger a decision tree. Using the data, the decision tree will guide the user through a conversation to find a set of results or an exact match for which the chatbot creator can define an appropriate action once the user reaches a leaf node in the decision tree. When this data changes, the chatbot behavior will automatically update in real-time.

As an example, for a shopping assistant chatbot with a data-driven decision tree, when the product catalog is updated with new items or attributes, the bot will automatically incorporate those changes. For example, for new, edited, or removed items, the chatbot will show the latest items and information dynamically. For an updated attribute like "shipping time" with a new value of "same day" added to the data, then the chatbot will also show the option to choose "same day" in addition to the original shipping times.

In some embodiments, the systems and methods described herein bots can be configured and the intent can be created with tree-like documents. The described platform makes chatbot creation easier and dynamic using tree-like documents, such as XML, HTML and JSON, to create and configure chatbot functionality. Many businesses already have large collections of documentation in these formats, so importing them as the first step in creating a bot significantly lowers the barrier to entry.

In a particular example, a user may configure a chatbot function for step-by-step troubleshooting instructions from a knowledge base with a large collection of articles. Each imported HTML article becomes an entry point for a conversation, where HTML elements are nodes in the conversation. The bot builder tool provides an editor for annotating the HTML with tags to indicate questions, answers, and links to other sections or articles. Once annotated, the HTML document is parsed by the chatbot and incorporated as an intent that can be triggered with keywords extracted from the document. This annotated HTML document is still a valid HTML document, so it can still be used in its original context as a webpage. That compatibility allows for a virtuous cycle of content creation in a customer's CMS, to chatbot annotation in the bot builder, and then back to the customer's CMS so that all of the content stays in sync.

Webhooks allows the chatbot to fetch data from a remote API server, database, or by scraping a website. There can be one or more webhooks defined for a chatbot and the guideline is to create a webhook for each API endpoint.

In some embodiments, each webhook definition has the following components:

Data Source: The systems and methods support fetching data from multiple data sources including remote databases, REST APIs, and web pages. The form-elements on the page allow the user to define the remote server address, authentication/authorization parameters, table name, and request parameters (based on the context).

Figure 8:
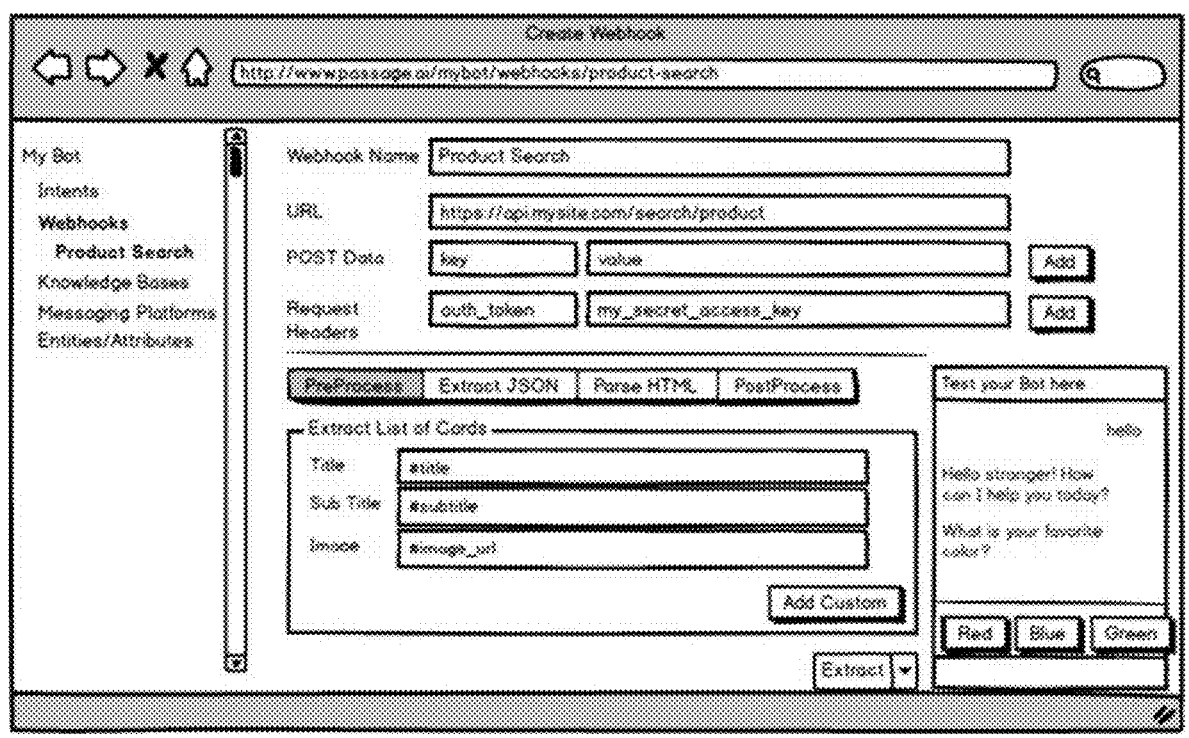
FIG. 8 illustrates an example user interface associated with webhooks.

Pre/Post Processing functions: An embedded code-editor allows the user to modify the incoming/outgoing data in a language of their choice. This allows the chatbot owner to customize the data coming from the source. FIG. 8 illustrates an example user interface 800 associated with webhooks.

Data Extraction: The systems and methods support extracting data from multiple formats including: HTML, JSON, XML, CSV, and the like. The data will be extracted and mapped to one or more of the predefined templates (carousel, receipt, decision tree, etc.).

This method of enabling a standardized/structured output from the webhooks, allows the chatbot platform to build connectors to easily translate data to the format that's required by different messaging platforms. A built-in testing tool allows the user to quickly test the webhook by sending requests directly to the API and the lightweight chat client integrated with the webhook editor allows for full end-to-end testing of the intent with actual data.

In some embodiments, the systems and methods can automatically render chatbot messages in appropriate formats for the conversation's medium. Since a chatbot can be deployed widely to many different messaging platforms, the bot builder platform automatically adapts messages to fit each messaging platform without any intervention required by the chatbot creator. In some implementations, the described systems and methods can automatically render chatbot messages in appropriate formats for both a platform and a media type depending on the content (e.g., data) that is selected for the bot to send to the user.

For example, with Facebook Messenger:
If a set of text and image are sent by the system, then automatically render in the Facebook Messenger format for cards.
If actions are provided, automatically display buttons.
If a list of user choices are provided, automatically display "quick reply" buttons.
If menu options for the chatbot have been configured, display them in the menu.
In another example, with Amazon Alexa:
Automatically render as voice interface.
Limit the length of system messages to not exceed an appropriate length for speech, then ask the user if they would like to hear more.
Read all options and choices aloud, regardless of whether they are actions (buttons) or options (quick replies).
Allow the user to interrupt at any time.
Describe images using a brief description of the content and use the Alexa API to place the image on the user's mobile device if they have it configured.

In the described systems and methods, the bot builder may allow the users to manage the entity/attributes and other data files. The user can add/delete/update the files and any changes are propagated to the rest of the system in real time. The entity/attribute files are private and are accessible only to the bot. In some embodiments, the user can upload "public" accessible files (e.g., HTML, JS, CSS, Images, JSON, etc.) also. These files may be referred to in the chatbot for certain use cases. Each of these files will be given a public URL. This allows the user to manage all data required for the chatbot in a single place without the need to have a distributed store for each component. The files are automatically backed up along with the chatbot configuration.

Figure 9:
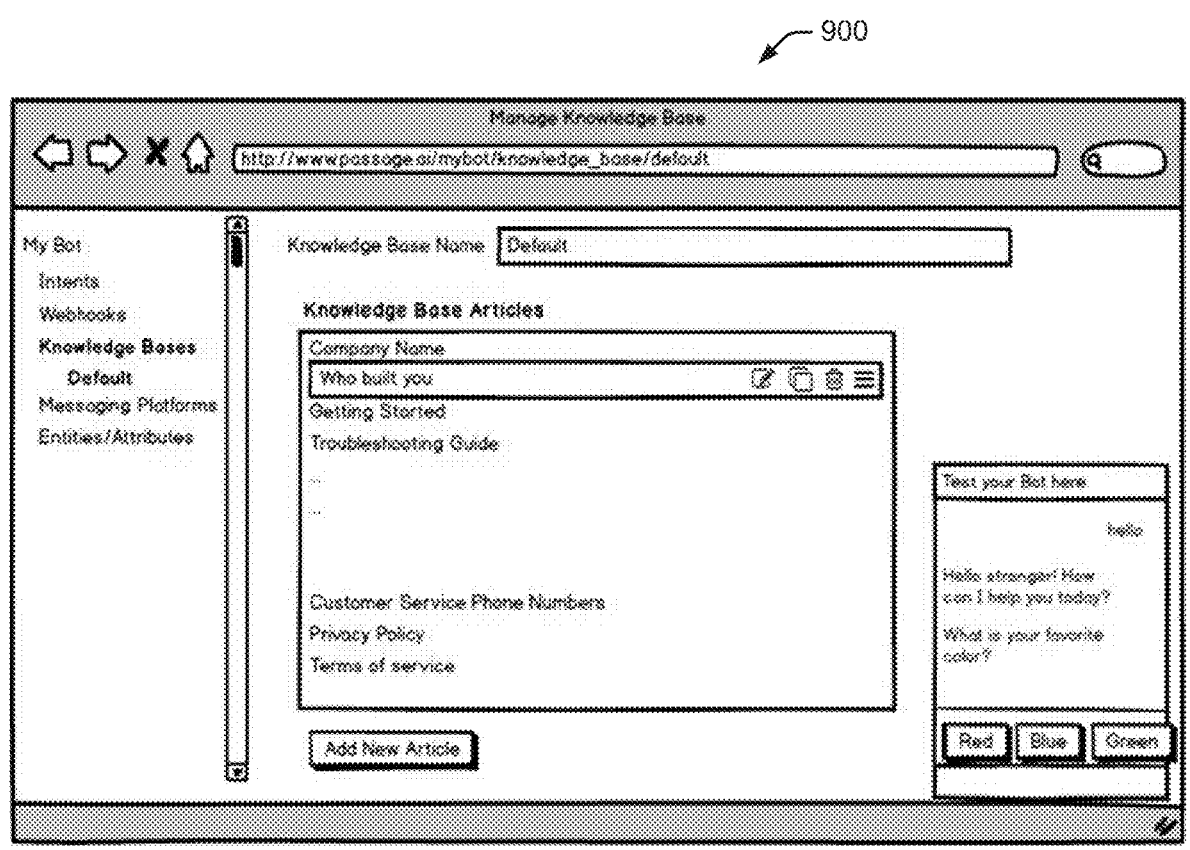
FIG. 9 illustrates an example user interface associated with a knowledge base.

In some implementations, the bot builder also features a built-in Content Management System to manage the knowledge base articles. The user can choose to add one or more knowledge bases and manage different types of articles. The knowledge base editor supports uploading different types of media including text, images, and video. The editor also supports customized features to manage complicated documents like setup and troubleshooting guides. FIG. 9 illustrates an example user interface 900 associated with a knowledge base.

The described systems and methods support intent identification and configuration in chatbots. In some embodiments, the systems and methods maintain a database where the set of all possible intents associated with the bot is stored. For each intent, the system stores a set of keyphrases that match this intent. For example, the "greetings" intent may have keyphrases such as "hi", "hello", "hola", etc. Any changes in intent keyphrases are propagated throughout the system for intent identification. In some situations, each intent keyphrase has a priority label, such as high or low. Low priority labels are designed for common words such as "hi" (which may not be the real intention).

In some embodiments, a set of rules are applied to perform text-based intent matching. These rules are based on string matching. For each input message, the systems and methods analyze the text and return a set of matches. The following example steps are followed in the system:

1. For each intent, obtain from the database the list of all keyphrases. If one or more keyphrases match the input message, then the matching intent will be added to the result.

2. Repeated Step 1 for each intent, except that this time the system applies text stemming in both the input message and the intent keyphrases.

For each matched intent, if the matching keyphrases are only "low priority", then the match is also marked "low priority". Additionally, the system computes the ratio between the length of the matching keyphrases and the length of the message, as a proxy score. If this ratio is high (e.g., higher than a predefined threshold), then the system is reasonably confident that this match is good quality. If there is no match, or all matches are low priority, or all matches are lower than the threshold, then the system also performs intent classification, as described below.

The string matching rules can be limited, given the richness of natural languages and there exist many different ways for people to express a certain intention. Thus, if text matching does not yield any result (or only low priority results), the system invokes intent classification, which is a machine learning method.

The systems and methods described herein need to be able to recognize correctly the customer's intent in order to give correct and intelligent responses. It is a foundational part of the chatbot system. Given any text input (or text converted from voice input), the system is able to correctly identify the intention behind this message. A machine learning system (also referred to as a machine learning model) handles this task. In some embodiments, the machine learning model includes one or more deep neural networks. Particular implementations use the Long Short-Term Memory (LSTM) technique.

The machine learning system has two distinct parts: training and prediction. Before going into the training and prediction details, this description outlines necessary text pre-processing steps to perform.

Given a user-input message, regardless of training or predicting, the common processing steps shared are:

1. Remove stop words ("a", "the", "this", "that", "I", "we", and so on) which are very common in English but are not meaningful enough to yield relevance.

2. Remove non-alphanumeric characters from the message, as they typically do not have strong linguistic values either.

a. One exception is that we do keep and make use of emoji's, which can be very useful in understanding users' emotion and sentiment.

3. Convert each word into a vector representation (word2vec). That is, each word is represented by a 300-dimensional dense vector with floating values.

a. This kind of vectors carry semantic meanings. E.g., vec("Paris")−vec("France")+vec("United Kingdom")=vec("London"). As another example, vec("king")−vec("man")+vec("woman")=vec("queen").

b. Note that words outside conventional dictionaries will not have vector representations.

4. Each word vector will be normalized by its L2-norm, and hence, mathematically all the vectors are of norm-1.

Figure 10:
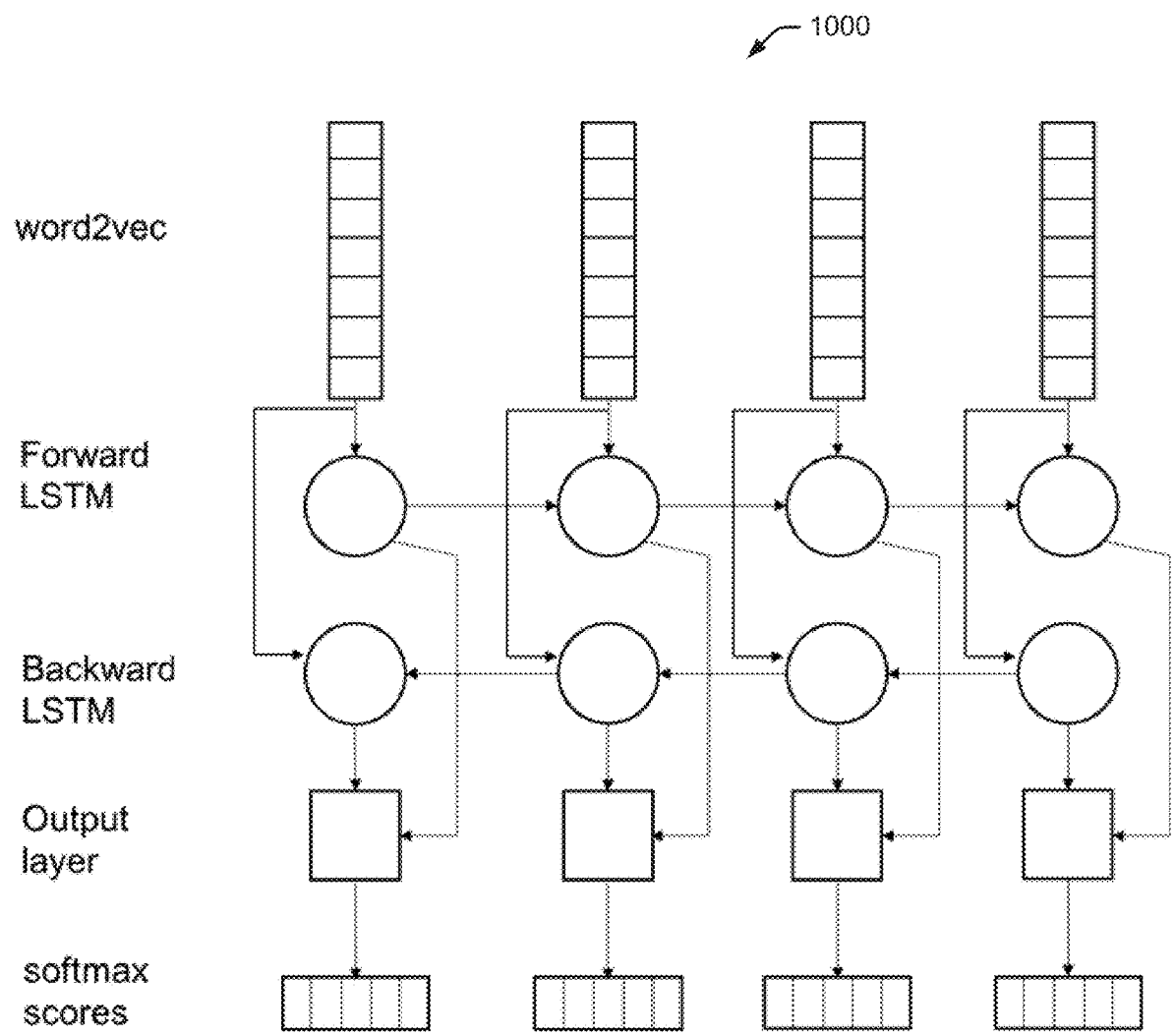
FIG. 10 is a block diagram depicting an embodiment of a training system and method.

FIG. 10 illustrates an example training system and method 1000 of the type discussed herein. As shown in FIG. 10, a first layer (word2vec) is the embedding layer which maps each word in the user message to a large dimensional vector. The embedding layer is learned offline using techniques like Word2vec. The second layer is forward and backward long short term memory network (LSTM). One can think of this layer as a state machine that parses the user message one word at a time. The state is highly distributed, i.e. it is a high dimensional vector and can learn several latent features from the user message. At each step of the state machine, the input consists of the next word from the user message as well as the previous state. The output is the new distributed value for the state. Each step of the LSTM is like parsing the corresponding word in the context of its neighboring words in the message. The final state is a vector representation of the entire user message which can be used for downstream tasks like intent classification. Unlike word vectors, which were computed independent of the user message, the output of the LSTM is highly dependent on the words in the user message and their relative positions. We use bidirectional LSTM so that all words have equal influence in the final state as opposed to the words which are in the later part of the message. A third layer is the output layer which is a dense one-layer neural network connecting the output of the second layer, i.e. the vector representation of the user message, with a softmax layer that computes probabilities over all intent classes. The system uses dropout at the recurrent layer of the LSTMs as well as the output layer.

In the training phase, the systems and methods provide data (typically a large size of data) into a machine learning model and let the model "learn" to recognize predefined patterns. The machine "learns" through a mathematical optimization procedure. In an intent identification module, the system uses deep learning techniques. Specifically, the system builds a multi-layer, bidirectional Recurrent Neural Network (RNN) with the Long Short-Term Memory (LSTM) architecture. RNN differs from regular neural nets in that each cell's output is again fed into itself for the next learning step. LSTM is a more complicated form of RNN: it adds additional mathematical transformation in each cell to capture long-term dependencies between cells and layers. RNN with LSTM provides strong capability to understand natural language, because it is able to extract and memorize context signals of the input text, which is important and is similar to how human beings process languages.

In some embodiments, the training data comes from customer service logs or other applicable conversation logs. Each data point consists of the text content (what the customer was saying) and a ground-truth label (what is the true intent). Typically, the labeling process is conducted manually. In some embodiments, the system makes use of crowdsourcing (e.g., Amazon Mechanical Turk) for this process.

The output layer of the neural network consists of N cells, where N is the number of intents (classes). To learn the parameters in the network (the weight on each link in the neural network), the system uses the stochastic gradient descent method. To avoid overfitting, the system uses the dropout method which probabilistically remove links between two layers of the neural network, in the hope that the learned network does not get too biased toward the training samples.

A prediction phase is part of the production pipeline. For each input message, the system first process it according to the steps defined in the text pre-processing steps to get its clean vector representation. The system then sends the word vectors into the LSTM-RNN model built from training. The model then gives a score between 0 and 1 to each label (possible intent). These scores (one per label) are normalized such that they sum to 1 and represent probabilities. The highest score is associated with the most likely intent, according to the model. The system outputs this intent and the score to the front-end of the system.

Entities and attributes are important things to extract from a user's message. They help the bot to understand the user's query. For example, "looking for a green dress in Kohls" means that the customer is essentially issuing a product search query with respect to green dresses. Here, "dress" is an entity (product) and "green" is an attribute (color). For each bot, the system has a predefined set of relevant entities and relevant attributes. Bot admins upload them, for example, as CSV files in a bot configuration console. Each type of entity or attribute has its own file. The system then writes a program that automatically convert the CSV files into JSON which is later convenient for the matching algorithm to load. The system also has programs that automatically detect changes in the CSV files (e.g., new files, deletion of old files, update to a new version, etc.) and will automatically reflect the changes in the JSON files as well.

The entity and attribute extraction algorithm works in the following steps:
1. For each bot, download the converted attribute and entity data files (JSON).
2. For each entity/attribute type (i.e., each JSON file), scan the corresponding JSON file and store the entity name in a data structure in the computer memory.
3. When each message comes into the system, conduct string matching.
4. A matched string will be output as an extracted entity or attribute, along with its type.

In some situations, an entity comes with multiple associated entities. And, even if the user input message does not mention such associated entities explicitly, it can be beneficial for the bot to infer it proactively. For instance, consider a message "Mountain View, Calif.". Here, not only "Mountain View" and "CA" can be extracted as the city name and state code, respectively, but the system can also determine the associated zip code. Knowing the zip code can help the bot to construct a better query in some use cases, e.g., a store locator query that only takes zip code as input.

The described systems and methods also perform sentiment analysis, which refers to detecting if a user's message is of positive or negative sentiment. Strongly negative sentiment means strong dissatisfaction and thus the bot may refer the user to a human customer service agent. This problem is formulated as a binary classification task, where there are two classes: negative (bad sentiment) and positive (OK or good sentiment). Each sentence, message, or portion of a message is categorized into one of the classes. The system also uses the Recurrent Neural Network technique with Long Short-Term Memory (LSTM-RNN) for this task. The rest of the process (training and scoring with LSTM-RNN) is quite similar to intent classification, as described above. Message text will be converted into vector representations and the system learns weights of the LSTM-RNN network using stochastic gradient descent.

The described systems and methods also perform complaint classification. For a bot in the context of customer service, it ideally should detect whether a customer is making a complaint, defined as a potentially complicated issue that can only be resolved by a human agent. It is thus important to recognize a message as a legitimate complaint at the first opportunity. In some embodiments, the described systems and methods build a binary classifier that categorizes messages as complaints or non-complaints. The idea is to make use of logistic regression, taking into account the following features:
1. Sentiment of the message: Generally, strongly negative sentiment tends to indicate a complaint.
2. Length of the message: In many cases, longer messages tend to be complaints because customers need to describe an issue in detail for the customer service department to understand.
3. Use of abusive words: Abusive words imply angry temper and strong dissatisfaction. This is typically a signal of a complaint as well.

Note that hard-wiring a rule based on the above is unlikely to yield a robust classifier, and this is where logistic regression comes in. In the training phase, the system gathers a set of messages, each with a label ("complaint" or "not a complaint"). For technical convenience, the system labels "complaint" as class 1 and "not a complaint" as class 0. For each message, the system computes the above three features (sentiment score, length, and a binary variable equal to 1 if abusive words exist and 0 otherwise). The system then fits a logistic regression model by minimizing an error function over the training set. The outcome is a coefficient of each feature.

In the prediction phase, the same feature computation steps are followed. Then, the following scoring is followed:

$$score = 1/1 + e^{\{-(c1*sentiment + c2*length + c3*is\_abusive)\}}$$

Where c1, c2, and c3 are the coefficient for sentiment, length, and abusive features, respectively. Number e is the base of the natural logarithm. Note that by definition, the score is a real value between 0 and 1. If the score is above a certain threshold (for instance, 0.5), then message is determined to be a complaint, and will route the customer (bot user) to a human customer service agent. The threshold is carefully chosen based on data analysis.

An important use case of the bot is to search a knowledge base or FAQ for the user. This functionality serves as a gateway to a human agent. This requires transforming a user's free-form input message into a proper query, so that the search can be effective and deliver relevant results. Given a customer input message, example query transformation steps are as follows:

1. Remove matched intent keyphrases from the message
2. Remove non alpha-numerical characters
3. Remove stopwords
4. Add extracted entities and attributes to the message The resulting message is a search query.

If the chatbot determines that the user's intent is to search a knowledge base or FAQ, it will first create a search query as described above. Then, the system sends the query to an ElasticSearch-based search engine to fetch relevant documents to answer the query. The described systems and methods use a scoring function to determine which documents should be deemed relevant to the query, and how they should be ranked. The scoring is a combination of two parts. The first part is the traditional TF-IDF approach. TF means term-frequency (how many times a query word appears in a document), and IDF intuitively measures how uncommon the term is throughout the whole knowledge base. For the second part, the system uses word vectors to transform query and documents in word vectors space and do the matching. This part also addresses synonyms matching without explicitly specifying synonyms. The system combines the scores from the two parts using a linear combination function to create a final score.

In some embodiments, the described systems and methods perform offline intent conflict identification and disambiguation. In some cases, specific intent matches may be in conflict with searches within a large corpus, such a knowledge base. Since searching the knowledge base for every message would be expensive, a better solution is to run an offline conflict identification process at regular intervals. By using the intent keywords (and eventually user messages matching that intent) to search the knowledge base for matches, the system can identify potential conflicts. Once likely conflicts are found above a certain threshold, the system can automatically a) show the user both options and let them pick, or b) alert the bot creator and let them pick a winner.

As an example, a user message of "How can I find an ATM in a foreign country?" could match with both an ATM locator intent and a knowledge base article. While the system can always offer the user a choice between the two matches by presenting a question like "Would like to find an ATM by location or search the knowledge base?", a better solution is to notify the bot creator that this conflict is occurring and giving the creator the option to choose the winner. In this case, searching the knowledge base is more appropriate for this request, so the bot creator provides that feedback. Subsequently, this enriches the data for training the models.

The systems and methods described herein provide a rich set of tools for business executives and other individuals to analyze how their users are conversing with them. Business executives can log in to the described platform to view and analyze the following anonymized metrics.

Figure 11:
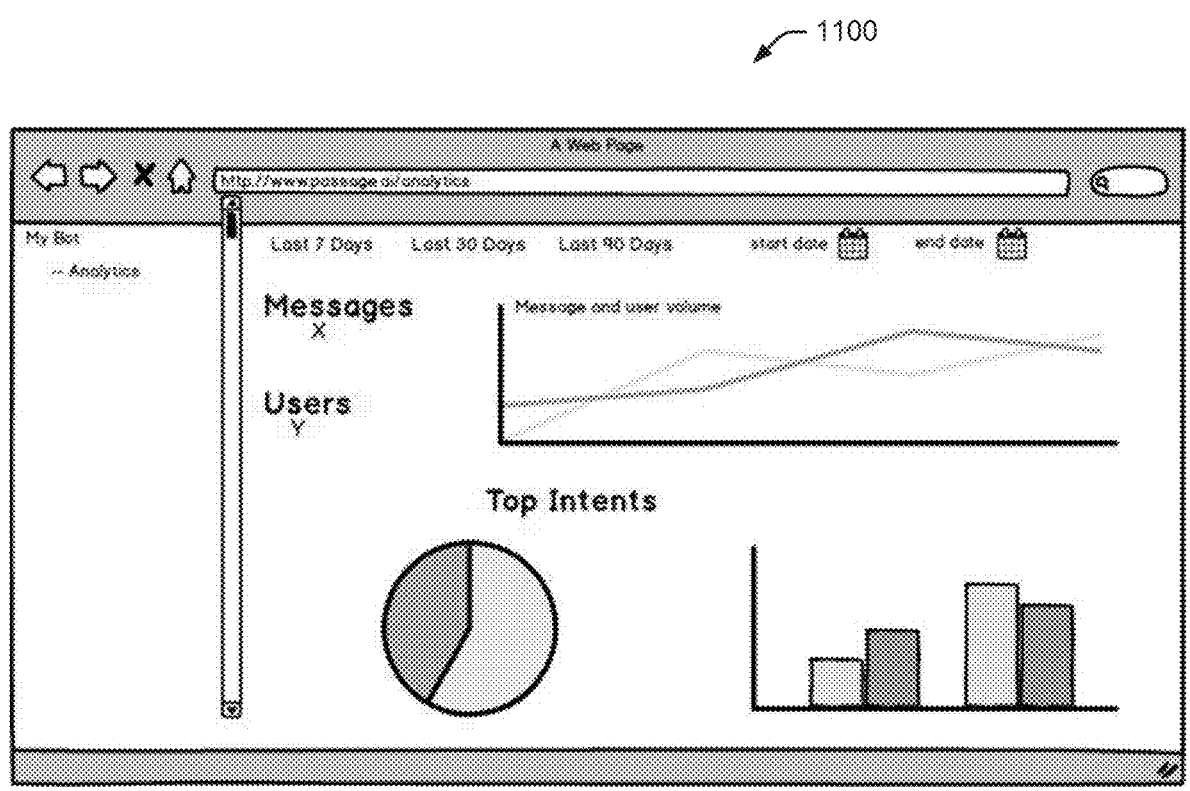
FIG. 11 illustrates an example analytics user interface displaying example analytical information.

1. Number of daily unique users that are conversing
2. Average messages for each unique user
3. List of the top intents that are being triggered
4. Individual chat messages, the intent that was triggered and how the bot responded to each of those messages
5. Response time for each of the chat messages
6. The sentiment of each chat message In some embodiments, business users can visualize the following using an analytics tool The entire chat conversation the user had with the platform over any time period.
How number of users have changed over time
How top intents have changed over time
How many users requested to be connected with customer service
How user sentiment went up or down in the course of a session
Number of times a set of intents were triggered over any given time period
Top questions that were asked but were not replied to accurately Each of the metrics above allow businesses and business leaders to understand the concerns and sentiments of their users which is a key input in better customer engagement. FIG. 11 illustrates an example analytics user interface 1100 displaying example information of the type discussed herein.

In some embodiments, the metrics are collected when each chat message in the system triggers an intent, which in turn can be configured to generate an appropriate response. As soon as the bot responds back to the user, the platform streams all this information to a data warehouse, such as AWS redshift, Google Big Query, or Azure data warehouse via a data streaming bus or queue. When a business user logs into the bot builder platform and navigates to the analytics page, the user interface (UI) makes a series of API calls to a backend service. The backend service then makes the individual data warehouse calls to the data warehouse that contains the information for the particular bot and sends it back to the UI. The UI then renders this information in a manner that is visually appealing and highly informative. The collection and analysis of the metrics happens in real time. This means that business users logged into the tool can view and analyze conversations that are happening at that exact time.

In some embodiments, the systems and methods abstract away the common elements of an intent configuration into a new term called a chatbot skill. A key observation is that for several generic use cases the intent configuration will be similar if not identical across several bots. For example, a store-locator intent configuration for the bot of one retail store may be very similar if not identical to the store locator intent configuration for the bot of another retail store.

A conversational interface (or chatbot) can be configured and trained to respond to specific categories of questions. In some embodiments, a chatbot platform offers a set of tools that enables creators of chatbots to build custom chatbots. These chatbots can be configured to recognize the "intent" of the user's message and respond to that intent in a customized way. In some implementations, each chatbot is configured with a set of intents, where each intent is configured with a set of search keywords and one or more webhooks. The search keywords inform the chatbot that a message from a user is associated with a specific intent. The webhooks for that intent enable the chatbot to retrieve the information on behalf of the user and respond to the user's message or query. Depending on the category of the intent, configuring the chatbot can involve multiple webhooks and custom logic.

As discussed herein, a chatbot skill is a pre-created bundling of generalized intents in a way that the skill can be imported into multiple chatbots. For example a "store locator skill" can be pre-created and imported into a multiple chatbots, where each chatbot services a specific retail store. This saves a chatbot creator for a specific store the time and resources required to create a chatbot with store locator functionality from scratch.

A chatbot skills marketplace is a platform that i) allows chatbot creators to create and innovate on chatbot skills; ii) allows chatbot creators to publish chatbot skills for sale; and iii) allows chatbot creators to browse through existing chatbot skills and import specific skills into their chatbot by paying a fee to the creator of those skills.

In some embodiments, a chatbot is a computer program that conducts a conversation with a human via audio or textual methods. A chatbot platform offers a self-service portal wherein users can log in and build chatbots to serve their specific needs. For example, product managers for a retail company with limited technology resources can login to such a portal a build a chatbot for their retail company. The chatbot can be configured and trained to respond to messages or queries about that retail company from human users.

In order to create such a chatbot, the chatbot platform will allow the chatbot creator to create and configure "intents". An intent is an entity in the chatbot platform that allows the chatbot to identify the actual intent of the human user's message. When creating chatbots, chatbot creators may create and configure these intent objects as a way of training the chatbot to recognize and respond to human messages. Such an intent object has multiple aspects to its configuration, as discussed below.

Search keywords include, for example, sets of text phrases that inform and/or train the chatbot that messages containing the keywords could be indicative that the user's intent. Webhooks (or external data sources) include, for example one or more API calls or calls to other data sources such as customer databases or object store data objects necessary to obtain information that can be surfaced back to the user in response to their message.

Data flow refers to, for example, the order in which data is collected, processed, transformed, and filtered before it can be surfaced back to the user. For example, in order to respond to a particular query, the chatbot may need to make a call to a particular API. Then, based on the information in the response, the chatbot may need to make an additional API call or a call to an object store. Finally, the chatbot may need to prune the information received and display information that is immediately relevant to the user's query. All of the described configuration information is stored in the context of the intent.

In some embodiments, a chatbot includes a set of intents created based on the aspects discussed herein.

In some embodiments, systems and methods described herein abstract away the common elements of an intent configuration into a chatbot skill. In a particular example, a store-locator intent configuration for a chatbot of one retail store is very similar (and possibly identical) to the store locator intent configuration for the chatbot of another retail store. So, a chatbot skill is a set of intents, where each intent includes keywords, data flow, and webhooks.

However, specific aspects of a chatbot, such as the "retail store name", are not included in the chatbot skill. Instead, placeholders are created for these aspects and they are specified when importing the skill into the chatbot. This a set of intents are pre-created into a "chatbot skill". Once a chatbot skill is created, it can be imported into a chatbot in order to be functional. At the time of importing the chatbot skill into a chatbot, the placeholders are specified. For example, if importing the chatbot skill into a chatbot for retail store called CoolKidsClothes, the "retail store name" of the chatbot skill is specified as "CoolKidsClothes". Once imported, the chatbot for CoolKidsClothes inherits all the intelligence in order to respond to users messages and queries regarding locating stores for CoolKidsClothes.

A chatbot skill makes it easier to create and bundle a set of intents once and then import it into multiple chatbots. However, instead of restricting the set of chatbot skills to those that were created by the operators of chatbot platform, a marketplace for chatbot skills opens up the platform to third party chatbot skill developers. Such a chatbot skills marketplace exposes a set of APIs to create and update intents, webhooks, and chatbot skills. Third party developers can then access this API in order to create their own set of chatbot skills, which they can then sell to chatbot creators on the platform. This open marketplace adds add value to chatbot creators. In some embodiments, chatbot creators will be offered a rich choice of chatbot skills to choose from when building their chatbots. The competition may improve the quality and quantity of chatbot skills available and may ultimately improve the chatbots built on the platform.

A chatbot skills marketplace may create "network effects" as each new chatbot skill created by a developer makes the platform more powerful, which in turn will attract other developers to create new chatbot skills.

As discussed herein, specific aspects of a chatbot such as the "retail store name" are not included in the chatbot skill. Instead, placeholders are created for these aspects and they are specified when importing the chatbot skill into the chatbot. Such a set of intents are pre-created into a "chatbot skill". At the time of importing the chatbot skill into a chatbot, the placeholders are specified. As mentioned above, if importing the chatbot skill into a chatbot for a retail store called CoolKidsClothes, the "retail store name" of the chatbot skill is specified as "CoolKidsClothes". Once imported, the chatbot for CoolKidsClothes inherits all the intelligence in order to respond to users messages and queries regarding locating stores for CoolKidsClothes.

The systems and methods discussed herein are capable of creating a chatbot skill. A chatbot skill comprises the following entities:

1. 0 or more intents
2. 0 or more webhooks
3. Relationships between intents.
4. Relationships between intents and webhooks
5. Placeholders that need to be "filled in" at the time of importing the chatbot skill into a chatbot Creating the chatbot skill involves creating one or more of the above entities. Each of the above can be created using a chatbot platform. The goal of a good chatbot platform is to make creation of above entities simple and intuitive via a user-friendly UI (user interface) and well-documented APIs in the backend. Once the above entities are created, they can be bundled as a "chatbot skill".

Figure 12:
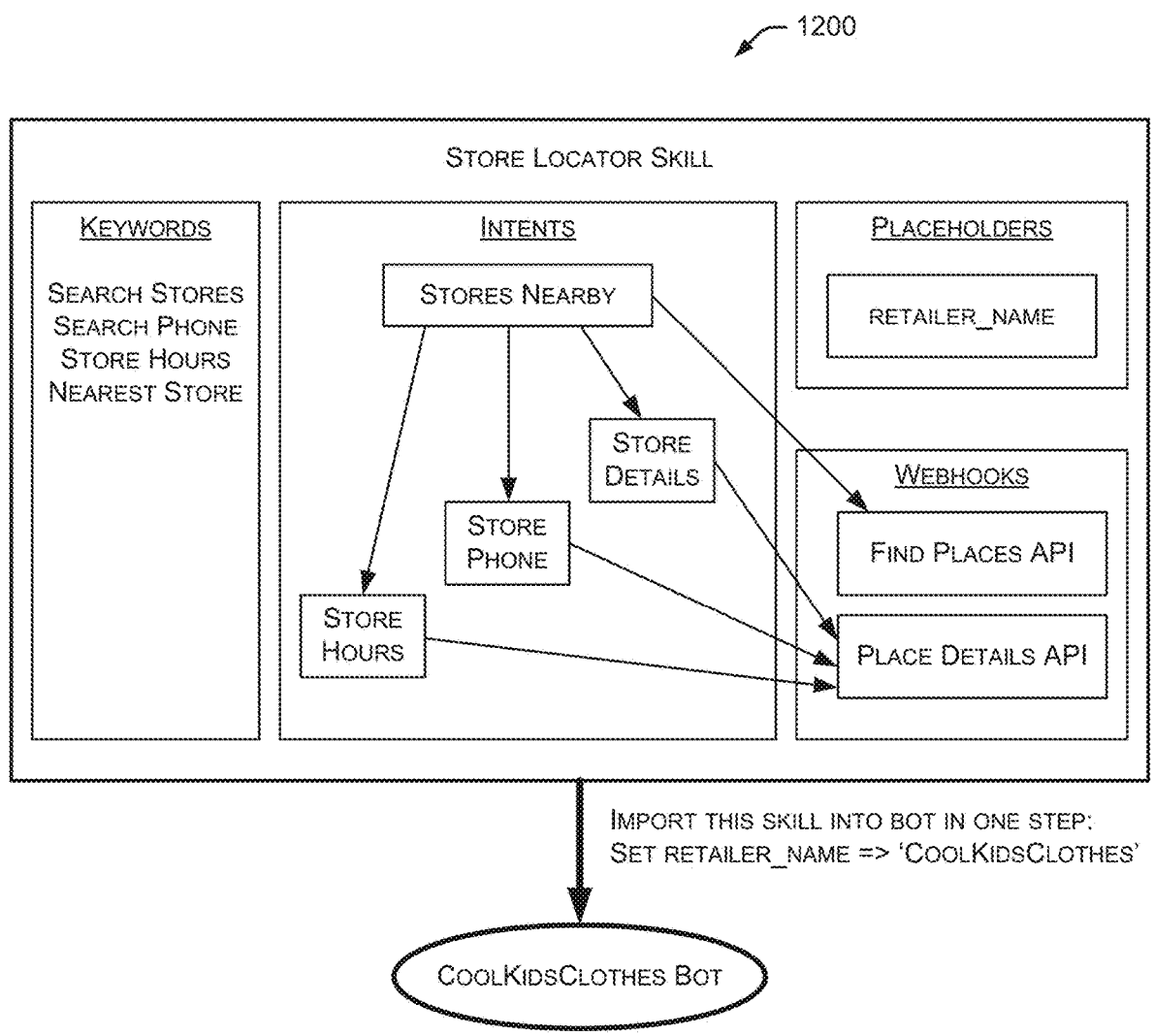
FIG. 12 is a block diagram depicting an example system and method of importing a skill into a chatbot.

FIG. 12 illustrates an example method 1200 of importing a skill into a chatbot. The example of FIG. 12 shows a store locator skill that contains keywords, intents, webhooks, placeholders, and the relationships between intents and between intents and webhooks. The power of the skill lies in the fact that all of that complexity can be imported into a bot with one step. The only information that needs to be provided at time of import is the placeholder values—in this case the retail store name. Once that is finished, the chatbot for the retail store will immediately be able to answer questions like "Where is the nearest CoolKidsClothes store". Once a skill is imported into the "CoolKidsClothes" bot, the bot will contain all of the intents and webhooks associated with the skill. Customers of CoolKidsClothes can then ask questions such as "Where is the nearest CoolKidsClothes store," "When does the nearest CoolKidsClothes store open," and "What is the phone number of the nearest CoolKidsClothes store?" For example, if the customer asks the question "Where is the nearest CoolKidsClothes store," that question will trigger the "Stores Nearby" intent. When the bot executes this intent, the bot will call the "Find Places API" webhook to retrieve the list of CoolKidsClothes store locations close to the customer and display the store location information to the customer.

Figure 13:
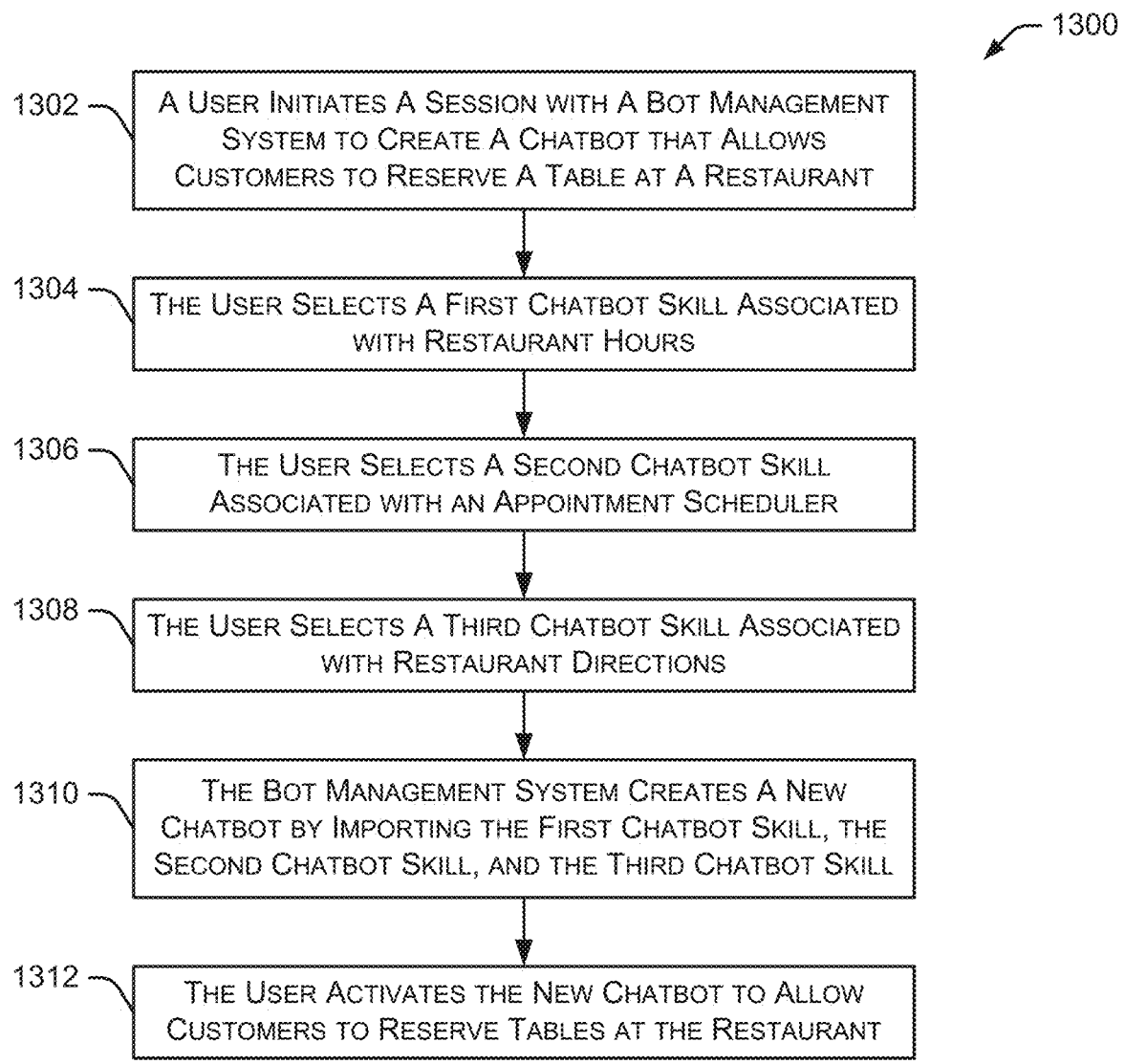
FIG. 13 is a flow diagram depicting an embodiment of a method for creating a chatbot based on multiple chatbot skills.

FIG. 13 is a flow diagram depicting an embodiment of a method 1300 for creating a chatbot based on multiple chatbot skills. The example of FIG. 13 is related to creating a chatbot that allows customers to reserve a table at a restaurant and get additional information about the restaurant. In other embodiments, a method similar to that shown in FIG. 13 can be applied to create any type of chatbot capable of performing various functions using any number of chatbot skills.

Referring to method 1300, a user initiates a session 1302 with a bot management system (such as bot creation and management system 102) to create a chatbot that allows customers to reserve a table at a restaurant and obtain additional information about the restaurant. In some embodiments, the user who initiates the session is an administrator of a system, a developer creating one or more chatbots, or a restaurant owner creating the chatbot for their own restaurant. As discussed herein, the user selects one or more chatbot skills to create the new chatbot for reserving a table at a restaurant and obtaining additional information. These chatbot skills have been created by other users or third-party developers. Various chatbot skills may be available for access or purchase through a chatbot skills marketplace or other chatbot skills repository.

Method 1300 continues as the user selects 1304 a first chatbot skill associated with restaurant hours. For example, the user may select the first chatbot skill from a chatbot skills marketplace. The user then selects 1306 a second chatbot skill associated with an appointment scheduler. Thus, the first chatbot skill can determine restaurant hours during a typical week, and the second skill can use the restaurant hours information to identify appropriate times for scheduling appointments (i.e., times when customers can reserve tables at the restaurant). The user then selects 1308 a third chatbot skill associated with restaurant directions and parking information. This third chatbot allows the newly created chatbot to provide directions and parking instructions to customers after they have completed their reservation with the restaurant.

Method 1300 continues as the bot management system creates 1310 a new chatbot by importing the first chatbot skill, the second chatbot skill, and the third chatbot skill. The new chatbot is then available for a user (or other individual) to activate 1312 and allow customers to reserve a table at a restaurant.

In some embodiments, different types of chatbot skills are available for use, such as immutable skills, mutable skills, and hybrid skills. Immutable skills are skills where none of the skill components can be edited in the chatbots that imported the skill. In some implementations, the components of the immutable skills may be updated and the updated skills (or skill components) are pushed to all of the chatbots into which the skill was imported. Mutable skills are skills where all of the skills components can be edited in the chatbots that imported them. The components of the skills themselves can be updated, but the updated components are not typically pushed to the chatbots into which they were imported. Hybrid skills are skills that are a combination of immutable and mutable components. In some embodiments, updates to immutable components of the hybrid skills are automatically pushed to all of the chatbots that imported the skill, while updates to mutable components are not pushed to the chatbots that imported the skill.

In particular implementations, when defining a skill, the skill builders can tag each component (such as intent, webhook, or utterance) of the skill as being mutable or immutable.

Figure 14:
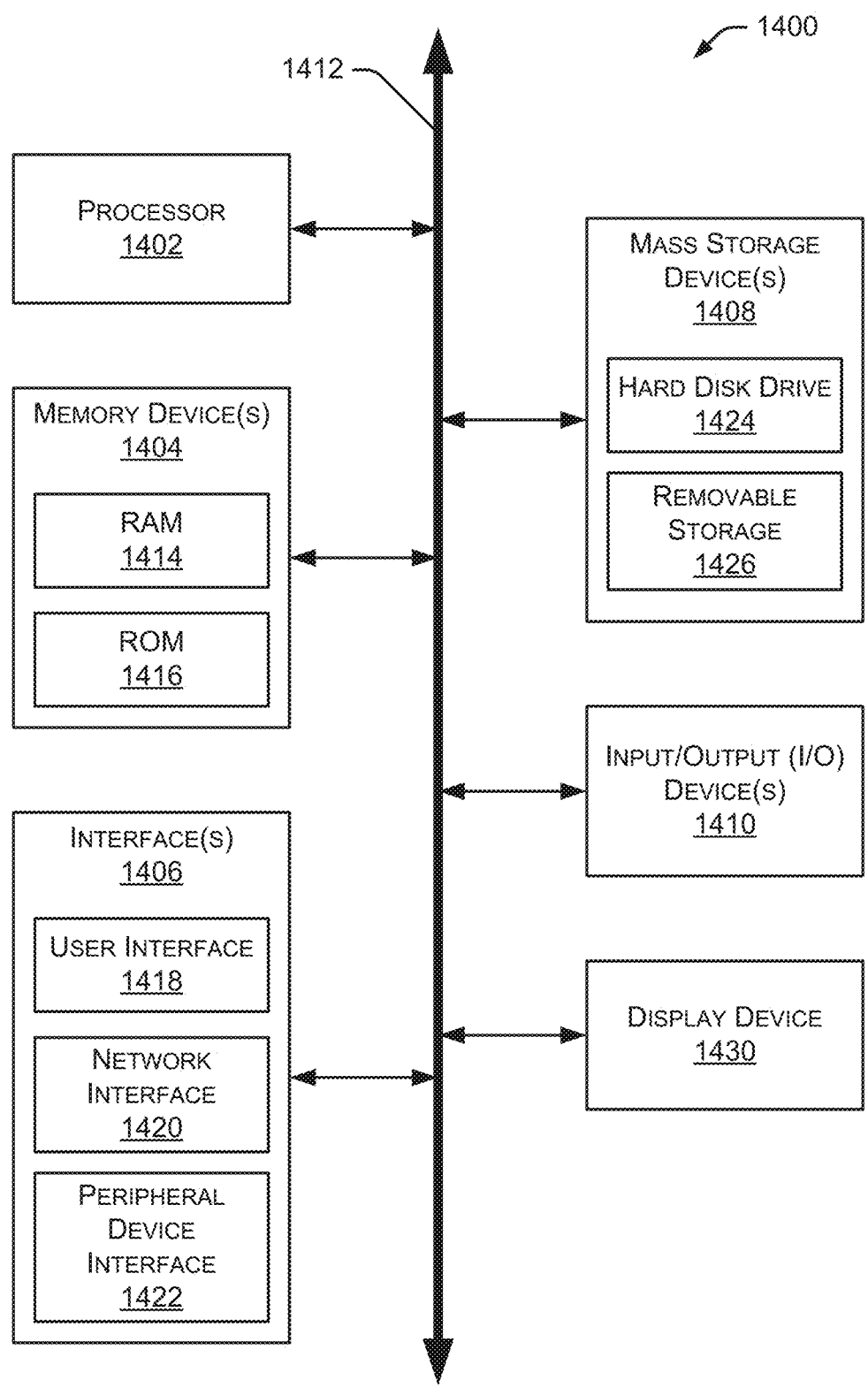
FIG. 14 is a block diagram illustrating an example computing device suitable for implementing the systems and methods described herein.

FIG. 14 is a block diagram illustrating an example computing device 1400 suitable for implementing the systems and methods described herein. In some embodiments, a cluster of computing devices interconnected by a network may be used to implement any one or more components of the systems discussed herein.

Computing device 1400 may be used to perform various procedures, such as those discussed herein. Computing device 1400 can function as a server, a client, or any other computing entity. Computing device can perform various functions as discussed herein, and can execute one or more application programs, such as the application programs described herein. Computing device 1400 can be any of a wide variety of computing devices, such as a desktop computer, a notebook computer, a server computer, a handheld computer, tablet computer and the like.

Computing device 1400 includes one or more processor(s) 1402, one or more memory device(s) 1404, one or more interface(s) 1406, one or more mass storage device(s) 1408, one or more Input/Output (I/O) device(s) 1410, and a display device 1430 all of which are coupled to a bus 1412. Processor(s) 1402 include one or more processors or controllers that execute instructions stored in memory device(s) 1404 and/or mass storage device(s) 1408. Processor(s) 1402 may also include various types of computer-readable media, such as cache memory.

Memory device(s) 1404 include various computer-readable media, such as volatile memory (e.g., random access memory (RAM) 1414) and/or nonvolatile memory (e.g., read-only memory (ROM) 1416). Memory device(s) 1404 may also include rewritable ROM, such as Flash memory.

Mass storage device(s) 1408 include various computer readable media, such as magnetic tapes, magnetic disks, optical disks, solid-state memory (e.g., Flash memory), and so forth. As shown in FIG. 14, a particular mass storage device is a hard disk drive 1424. Various drives may also be included in mass storage device(s) 1408 to enable reading from and/or writing to the various computer readable media. Mass storage device(s) 1408 include removable media 1426 and/or non-removable media.

I/O device(s) 1410 include various devices that allow data and/or other information to be input to or retrieved from computing device 1400. Example I/O device(s) 1410 include cursor control devices, keyboards, keypads, microphones, monitors or other display devices, speakers, printers, network interface cards, modems, lenses, CCDs or other image capture devices, and the like.

Display device 1430 includes any type of device capable of displaying information to one or more users of computing device 1400. Examples of display device 1430 include a monitor, display terminal, video projection device, and the like.

Interface(s) 1406 include various interfaces that allow computing device 1400 to interact with other systems, devices, or computing environments. Example interface(s) 1406 include any number of different network interfaces 1420, such as interfaces to local area networks (LANs), wide area networks (WANs), wireless networks, and the Internet. Other interface(s) include user interface 1418 and peripheral device interface 1422. The interface(s) 1406 may also include one or more user interface elements 1418. The interface(s) 1406 may also include one or more peripheral interfaces such as interfaces for printers, pointing devices (mice, track pad, etc.), keyboards, and the like.

Bus 1412 allows processor(s) 1402, memory device(s) 1404, interface(s) 1406, mass storage device(s) 1408, and I/O device(s) 1410 to communicate with one another, as well as other devices or components coupled to bus 1412. Bus 1412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1400, and are executed by processor(s) 1402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
    initiating, by a bot management system, a session to create a new chatbot;
    receiving a first selection of a first chatbot skill to be associated with the new chatbot, wherein the first chatbot skill includes a first set of instructions with at least one property having at least one placeholder value, wherein the instructions of the first chatbot skill define a first intent that determines how the new chatbot responds to user messages including a first keyword;
    receiving a second selection of a second chatbot skill to be associated with the new chatbot, wherein the second chatbot skill is different from the first chatbot skill, wherein the second chatbot skill includes a second set of instructions defining a second intent that further determines how the new chatbot responds to user messages including a second keyword; and
    creating, by the bot management system, the new chatbot by importing the first chatbot skill and the second chatbot skill into the new chatbot, wherein importing the first chatbot skill comprises replacing the at least one placeholder value in the first set of instructions of the first chatbot skill with at least one specified value.

2. The method of claim 1, further comprising communicating, by the bot management system, the new chatbot to a system for execution.

3. The method of claim 1, comprising:
    providing a chatbot skills marketplace, wherein the chatbot skills marketplace is configured to receive the first selection of the first chatbot skill and the second selection of the second chatbot skill.

4. The method of claim 1, wherein the first set of instructions of the first chatbot skill defines a third intent that further determines how the new chatbot responds to user messages including a third keyword.

5. The method of claim 1, wherein the first intent further includes a data flow and a webhook, wherein the data flow and the webhook are configured to be performed in response to detecting the first keyword in the user messages.

6. The method of claim 1, wherein the first set of instructions of the first chatbot skill defines a relationship between the first intent and the second intent.

7. The method of claim 1, further comprising receiving a selection of a third chatbot skill to be associated with the new chatbot, wherein the third chatbot skill includes a third set of instructions defining a third intent that determines how the new chatbot responds to user messages that include a third keyword, and wherein creating the new chatbot further includes importing the third chatbot skill.

8. A method comprising:
    initiating, by a bot management system, a session for a developer to create a new chatbot;
    receiving, from the developer, a selection of a first chatbot skill from a chatbot skills marketplace to be associated with the new chatbot, wherein the first chatbot skill includes a first set of instructions with at least one property having at least one placeholder value, wherein the instructions of the first chatbot skill define a first intent that determines how the new chatbot responds to user messages that match the first intent;
    receiving, from the developer, a selection of a second chatbot skill from the chatbot skills marketplace to be associated with the new chatbot, wherein the second chatbot skill is different from the first chatbot skill, and wherein the second chatbot skill includes a second set of instructions defining a second intent that further determines how the new chatbot responds to user messages that match the second intent;
    receiving, from the developer, at least one input that corresponds to the at least one placeholder value of the first chatbot skill; and
    creating, by the bot management system, the new chatbot by importing the first chatbot skill and the second chatbot skill into the new chatbot, wherein importing the first chatbot skill comprises replacing the at least one placeholder value in the first set of instructions of the first chatbot skill with the at least one input received from the developer.

9. The method of claim 8, further comprising communicating, by the bot management system, the new chatbot to a system for execution.

10. The method of claim 8, wherein the first set of instructions of the first chatbot skill defines a third intent that further determines how the new chatbot responds to user messages that match the third intent.

11. The method of claim 8, wherein the first intent further includes a set of keywords, a data flow, and a webhook, wherein the data flow and webhook are configured to be performed in response to detecting at least one of the set of keywords in user messages.

12. The method of claim 8, wherein the first set of instructions of the first chatbot skill defines a relationship between the first intent and the second intent.

13. A bot management system comprising:
    a communication manager configured to receive, from a communicatively coupled computing system of a developer, a first selection of a first chatbot skill to be associated with a new chatbot and receive a second selection of a second chatbot skill to be associated with the new chatbot, wherein the second chatbot skill is different from the first chatbot skill, wherein the first chatbot skill includes a first set of instructions defining a first intent that determines how the new chatbot responds to user messages and includes a first keyword, and wherein the second chatbot skill includes a second set of instructions defining a second intent that further determines how the new chatbot responds to user messages and includes a second keyword, wherein the first set of instructions includes a first property with a first placeholder value, the second set of instructions includes a second property with a second placeholder value, and wherein the communication manager is configured to receive, from the computing system of the developer, a first input that corresponds to the first placeholder value and a second input that corresponds to the second placeholder value; and a bot building module configured to create the new chatbot by importing the first chatbot skill and the second chatbot skill into the new chatbot, wherein importing the first chatbot skill comprises replacing first placeholder value in the first set of instructions with the first input and replacing the second placeholder value in the second set of instructions with the second input.

14. The bot management system of claim 13, wherein the communication manager is further configured to communicate the new chatbot to another system for execution.

15. The bot management system of claim 13, wherein the first set of instructions of the first chatbot skill defines a first dataflow and a first webhook of the first intent, wherein the first dataflow and the first webhook are configured to be performed in response to the first keyword being detected in user messages.

16. The bot management system of claim 15, wherein the second set of instructions of the second chatbot skill defines a second dataflow and a second webhook of the second intent, wherein the second dataflow and the second webhook are configured to be performed in response to the second keyword being detected in user messages.

17. The method of claim 1, wherein the first selection and the second selection are received from a developer of the new chatbot.

18. The method of claim 17, comprising:
before creating the new chatbot, receiving, from the developer, the at least one specified value that corresponds to the at least one placeholder value in the first set of instructions.

19. The method of claim 1, wherein the first set of instructions of the first chatbot skill defines a relationship between the first and second intents and a webhook.

20. The method of claim 8, wherein the first set of instructions of the first chatbot skill defines a relationship between the first and second intents and a webhook.

* * * * *